(12) United States Patent
Chopra et al.

(10) Patent No.: US 10,001,929 B2
(45) Date of Patent: Jun. 19, 2018

(54) METHOD AND SYSTEMS FOR SIMULATING A WORKLOAD OF A STORAGE SYSTEM

(71) Applicant: FUJITSU LIMITED, Kawasaki-Shi (JP)

(72) Inventors: Ashish Chopra, Berlin (DE); Jürgen Binder, Paderborn (DE); Rainer Montag, Paderborn (DE)

(73) Assignee: FUJITSU LIMITED, Kawasaki (JP)

( * ) Notice: Subject to any disclaimer, the term of this patent is extended or adjusted under 35 U.S.C. 154(b) by 849 days.

(21) Appl. No.: 14/471,704

(22) Filed: Aug. 28, 2014

(65) Prior Publication Data
US 2015/0066470 A1 Mar. 5, 2015

(30) Foreign Application Priority Data
Aug. 30, 2013 (EP) .................................... 13182403

(51) Int. Cl.
 *G06F 3/06* (2006.01)
 *G06F 9/455* (2018.01)
 *G06F 11/34* (2006.01)

(52) U.S. Cl.
 CPC .......... *G06F 3/0613* (2013.01); *G06F 3/0605* (2013.01); *G06F 3/067* (2013.01); *G06F 3/0632* (2013.01); *G06F 3/0653* (2013.01); *G06F 3/0664* (2013.01); *G06F 3/0689* (2013.01); *G06F 9/455* (2013.01);
 (Continued)

(58) Field of Classification Search
 CPC .................................................... G06F 3/0613
 See application file for complete search history.

(56) References Cited

U.S. PATENT DOCUMENTS

| | | | |
|---|---|---|---|
| 7,392,360 B1 | 6/2008 | Aharoni et al. | |
| 8,880,801 B1 * | 11/2014 | Robins | G06F 12/0246 |
| | | | 711/114 |

(Continued)

OTHER PUBLICATIONS

Takeshi Ito, Atsuo Ouchi "Technologies of ETERNUS VS900 Storage Virtualization Switch", FUJITSU Sci. Tech . J., 42,1,(Jan. 2006) p. 17-24.*

(Continued)

*Primary Examiner* — S. Sough
*Assistant Examiner* — Abdou Seye
(74) *Attorney, Agent, or Firm* — Fujitsu Patent Center (57) ABSTRACT

A computer system that simulates a workload of a storage system including a non-transitory storage medium including instruction code for the computer system, wherein the instruction code, when executed on the computer system, performs steps as follows: obtaining configuration data regarding first components of the first storage system including at least one RAID group; obtaining performance data including workload information of the first storage system; configuring second components of a second storage system including at least one corresponding RAID group corresponding to the at least one RAID group of the first storage system, based on the obtained configuration data; and operating the second storage system using a simulated workload based on the obtained performance data, resulting in a front loading of the second storage system equivalent to a front loading of the first storage system.

15 Claims, 7 Drawing Sheets

(52) U.S. Cl.
CPC ...... *G06F 11/3414* (2013.01); *G06F 11/3485* (2013.01); *G06F 11/3409* (2013.01); *G06F 2009/4557* (2013.01)

(56) References Cited

U.S. PATENT DOCUMENTS

| | | | | |
|---|---|---|---|---|
| 2006/0161753 | A1* | 7/2006 | Aschoff | G06F 3/0613 711/170 |
| 2009/0089462 | A1* | 4/2009 | Strutt | G06F 3/0607 710/16 |
| 2012/0042061 | A1 | 2/2012 | Ayala et al. | |
| 2012/0110260 | A1 | 5/2012 | Chavda et al. | |
| 2013/0262762 | A1* | 10/2013 | Igashira | G06F 12/00 711/114 |
| 2014/0122387 | A1* | 5/2014 | Chi | G06N 5/04 706/12 |
| 2014/0130055 | A1* | 5/2014 | Guha | G06F 3/0604 718/104 |

OTHER PUBLICATIONS

Mohammad Reza Ahmadi et al. "Effect of Virtual Techniques in Data Storage Access", 2010IEEE pp. 91-96.*
EPOA—European Office Action for European Patent Application No. 13182403.9 dated Dec. 14, 2016.
VMWARE: "VMware I/O Analyzer Installation and User's Guide", Apr. 12, 2013, pp. 1-34, XP055315742, Retrieved from the Internet: URL:http://download3.vmware.com/software/vmw-tools/ioanalyzer/IOAnalyzerGuide_1.5.1_20130412.pdf [retrieved on Nov. 2, 2016].
Daniel Worden., "Advantages of using VMware Storage I/O Control with UCP Select for VMware vSphere using Hitachi Unified Storage VM", Lab Validation Report, HITACHI Technical Paper, Apr. 19, 2013, 34 pages, Hitachi Data Systems Corporation, USA.

* cited by examiner

- Volume name

- Average [Read + write IOPS (for selected Time segment)]

METHOD AND SYSTEMS FOR SIMULATING A WORKLOAD OF A STORAGE SYSTEM

TECHNICAL FIELD

This disclosure relates to a method of simulating a workload of a storage system and to the use of performance data, a computer system that simulates a workload of a storage system, and a computer program product.

BACKGROUND

Due to the increase in data to be processed and stored electronically, computer based storage systems have grown ever more complex over recent years. This trend has recently been accelerated by the widespread use of centralized data management in so-called "data centers" as well as server virtualization. As a consequence, storage systems of data centers often comprise a large number of storage devices such as magnetic or magneto/optical storage drives, non-volatile semiconductor memory devices, magnetic tape storage devices, and others. The individual storage devices are often grouped to form more complex storage subsystems, for example, redundant array of independent disks (RAID) systems comprising a large number of storage devices. Such storage subsystems are sometimes further aggregated to form storage systems connected by one or more storage area networks (SAN). For both performance and redundancy reasons, components of such a complex storage system are often replicated at various levels of the storage architecture.

As the complexity of storage systems grows, the task of optimizing and maintaining the storage systems becomes more complex. For this purpose, storage systems currently available often provide specialized software tools that allow a limited analysis of the operation of the storage system such as measuring the amount of available storage capacity, measuring actual data throughput and the like. While such data is useful to monitor the current operating status of a storage system, it is insufficient to analyze a storage system in detail in case an error occurs or to optimize the performance of the storage system. Consequently, it could be helpful to provide methods and systems that enhance the capability of analyzing and better controlling a storage system.

SUMMARY

We provide a computer system that simulates a workload of a storage system including a non-transitory storage medium comprising instruction code for the computer system, wherein the instruction code, when executed on the computer system, performs steps as follows: obtaining configuration data regarding first components of the first storage system, including at least one RAID group; obtaining performance data comprising workload information of the first storage system; configuring second components of a second storage system including at least one corresponding RAID group corresponding to the at least one RAID group of the first storage system, based on the obtained configuration data; and operating the second storage system using a simulated workload based on the obtained performance data, resulting in a front loading of the second storage system equivalent to a front loading of the first storage system.

We also provide a method of simulating a workload of a storage system including obtaining configuration data regarding first components of a first storage system; obtaining performance data including workload information of the first storage system; configuring second components of a second storage system based on the obtained configuration data; and operating the second storage system using a simulated workload based on the obtained performance data.

We further provide a computer system that simulates a workload of a first storage system including at least one hypervisor and a plurality of virtual machines executed by the hypervisor, wherein each virtual machine operates at least one RAID group of a second storage system corresponding to at least one associated RAID group of a first storage system, the virtual machines are configured based on configuration data obtained from the storage dump of the first storage system, and a simulated workload is created for each virtual machine using fingerprint data generated based on analyzing performance data of the first storage system.

LIST OF REFERENCES 100 method for simulating a workload
200 storage system (to be analyzed)
210 front end port
220 back end port
230 disk (of the storage system 200)
310 path
320 RAID volume
330 RAID group
340 host group
350 port group
360 LUN group
400 (simulating) storage system
410 host port
420 storage port
430 network switch
440 server computer
450 test environment
510 virtual machine
600 architecture
610 hypervisor
620 RAID system (of the storage system 400)
630 disk (of the storage system 400)
710 first fingerprint
720 second fingerprint

DETAILED DESCRIPTION

We provide a method of simulating a workload of a storage system. The method may comprise:

obtaining configuration data regarding first components of the first storage system, obtaining performance data, the performance data comprising workload information of the first storage system, configuring second components of a second storage system based on the obtained configuration data, and operating the second storage system using a simulated workload based on the obtained performance data.

The method may provide two elements that may help to analyze a storage system. First, rather than operating on the first storage system itself, corresponding components of a second storage system are configured based on configuration data obtained from the first storage system. For example, rather than operating a storage system deployed at a customer site, a storage system of a manufacturer or service company employed in a test environment may be operated. In this way, interference with the actual operation of the first storage system can be avoided. Second, rather than using an actual workload which may comprise confidential or otherwise restricted information and may not be easily available at a point of analysis, a simulated workload based on performance data comprising workload information of the first storage system is used to operate the second storage system. In this way, a method of simulating a workload of a storage system can be provided, which is independent of the first storage system and does not require the setup of a storage system identical to the first storage system.

Preferably, the number of second components of the second storage system is smaller than the number of first components of the first storage system. By way of simulation, the hardware requirements to simulate the workload of a storage system can be reduced. For example, the simulation may be generated by emulating the hardware of the first storage system such that the hardware requirements of the second storage system are minimized.

In particular, only first components of the first storage system having a corresponding workload in excess of predefined thresholds need be mapped to a corresponding second component of the simulating storage device. By omitting unused or hardly used components such as RAID groups not accessed by an application to be simulated, the complexity of the second storage system can be reduced.

Alternatively or in addition, the first components comprise a first plurality of ports, the configuration data comprise information about at least one port group and, for each port group, information about a first group of ports of the first plurality of ports associated with the respective port group. The second components comprise a second plurality of ports, wherein the simulating system is configured to create only those port groups comprising at least one port of the second plurality of ports and to associate only those ports of the second plurality of ports with a corresponding port group of the simulating system. For redundancy reasons, storage systems deployed in a data center often comprise port groups that comprise a number of redundant ports. However, when the second storage system comprises a smaller number of ports, individual ports or entire port groups may be omitted in the system configuration of the second storage system without affecting operation of the simulating storage device under normal conditions, i.e. without breakdown of a particular component.

Furthermore, the first components may comprise at least one first RAID group and a first set of storage devices associated with the first RAID group, and the configuration data comprises data indicating a RAID level used by the first RAID group. The second components comprise a corresponding second RAID group and a second set of storage devices associated with the second RAID group, wherein the second set of storage devices consists of a minimum number of storage devices required to simulate a RAID group using the RAID level indicated by the configuration data. As a further simplification, simulated RAID groups may be configured with a minimum number of storage devices required to implement a used RAID level of the first storage system. That is, not all storage devices provided in the actual first storage system need to be provided in the second storage system to provide an equivalent functionality.

The information required to configure the second storage system and operating the second storage system with a simulated workload may comprise obtaining and analyzing a dump file of the first storage system. Such data representative of the configuration of a first storage system is often provided by a control software of a storage system. Based on this information, a semi-automatic or fully automated system to configure the second storage system may be provided.

The method may further comprise analyzing the obtained performance data of the storage system to generate fingerprint data comprising workload information for a simulated workload. The use of fingerprint data to generate a simulated workload has the advantage that the second storage system can be operated with an equivalent workload without reproducing the actual data from the first storage system.

In the step of obtaining configuration data regarding first components, configuration data of at least one physical hardware component of the first storage system may be obtained and, in the step of configuring second components, a corresponding virtual hardware component of a test environment is configured. By the use of virtualization, the hardware requirements of the test environment can be further reduced.

In particular, the first storage system may comprise a plurality of RAID groups and the test environment may comprise a corresponding number of RAID groups, wherein for each RAID group a virtual machine controlled by a common hypervisor of the test environment is created. In this way, a test environment for the second storage system may be generated in a fast and efficient manner based on a template virtual machine, thus obliterating the need to provide or copy physical application servers generating a workload on the second storage system.

Preferably, data of the simulated workload in the second storage system follows a path corresponding to a path of data in the first storage system. In this way, the front loading of the second storage system corresponds to the front loading of the first storage system. In other words, the data follows the same storage path as in the environment of the first storage system.

The method may further comprise the step of generating a visual representation of the simulated workload and/or a workload of the first storage system. This will help the user to analyze the similarities between the simulated and the original environment.

Performance data of a first storage system, which comprises a plurality of components that form at least one RAID group, may be used to generate a simulated workload to operate a second storage system including a corresponding RAID group. The simulated workload results in a front loading of the second storage system equivalent to the front loading of the first storage system.

The use of performance data to generate a simulated workload has the advantage that a second storage system comprising, for example, virtual components and/or a reduced number of physical components, having an equivalent configuration to the first storage system, can be operated with an equivalent workload without reproducing the actual data from the first storage system.

We also provide a computer system to simulate a workload of a first storage system. The computer system comprises at least on hypervisor and a plurality of virtual machines executed by the hypervisor, wherein each virtual machine is configured to operate at least one RAID group of a second storage system corresponding to at least one associated RAID group of a first storage system. Therein the virtual machines are configured based on configuration data obtained from the storage dump of the first storage system, and a simulated workload is created for each virtual machine using fingerprint data generated based on analyzing performance data of the first storage system. The computer system can be used to execute the above-described fingerprint and/or to implement the above-described method.

The method may be executed on a computer system by executing instruction code of a computer program product stored on a non-volatile storage medium.

Our methods and systems will be described in more detail with respect to a specific example with reference to the following figures.

Throughout the figures, common reference signs will be used for corresponding components of various examples of our methods and systems.

Figure 1:
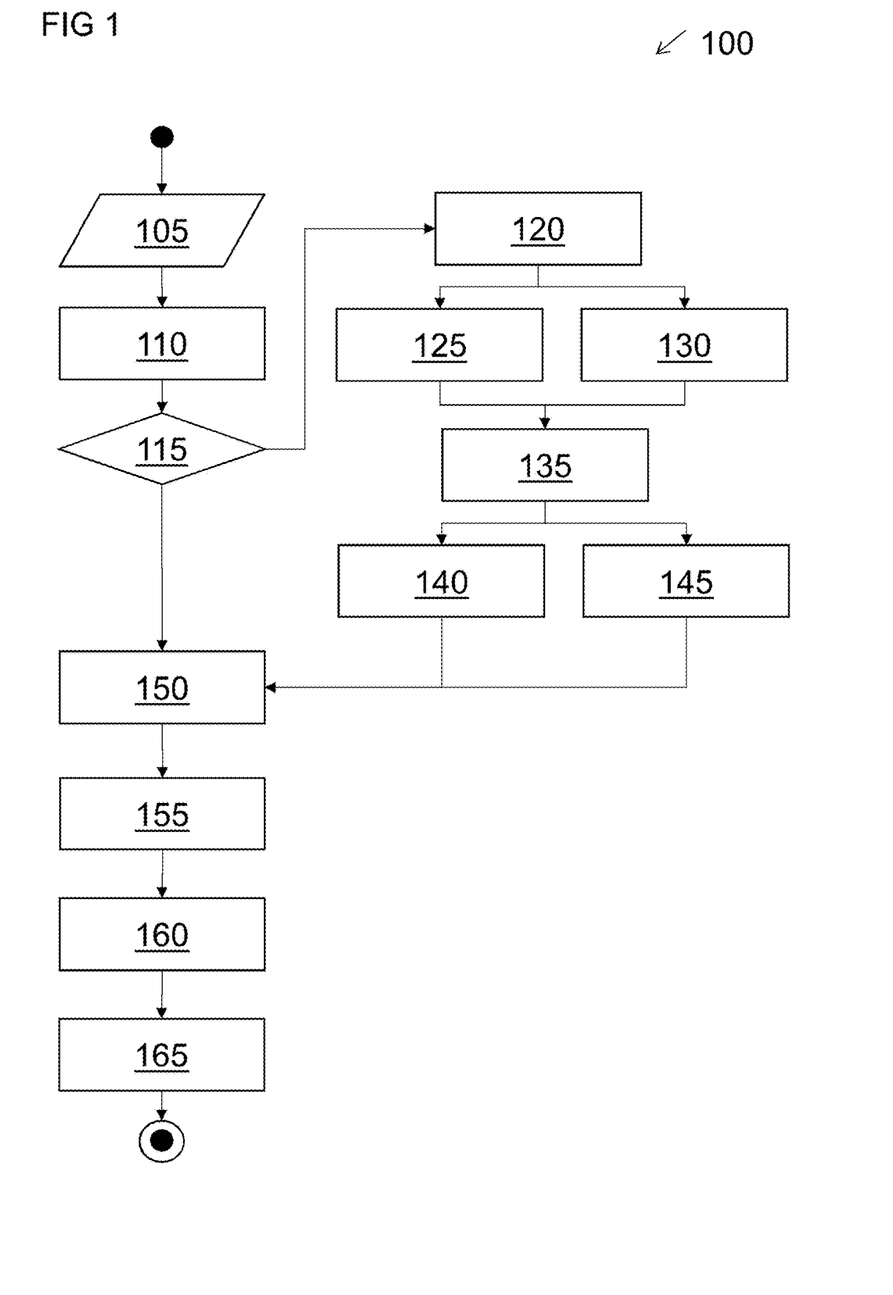
FIG. 1 shows a flow chart of a method of simulating a workload of a storage system.

FIG. 1 shows a flow chart of a method 100 of simulating a workload of a storage system. The method 100 in accordance with FIG. 1 overall achieves two key targets, simulation of hardware of a first storage system and simulation of a workload of the storage system.

Through the simulation of hardware of the storage system, either the minimum hardware required to allow a meaningful simulation of the first storage system or at least a significantly reduced number of hardware components compared to the first storage system can be used for fault analysis or performance evaluation. By this process, a simplification and, if required, mapping of components from the first storage system to components, physical or virtual, of a second storage system is established as detailed below.

The simulation of a storage system's workload results in regeneration of a workload scenario or a usage pattern of a customer storage system for performance evaluation without the need to reproduce all the data used by the customer. By generating a simulated workload rather than using the original data, copying a considerable amount of data can be avoided. Furthermore, no security concerns often associated with mission critical data such as confidential business information or private customer information, arise.

Method 100 starts with step 105 in which a user of a simulation software provides information regarding the first storage system. For example, the user provides a storage dump of the first storage system as well as performance data obtained from the first storage system. Such information is usually provided in the form of automatically created log files for most storage systems and can be uploaded in a corresponding software tool for simulating the workload.

The storage dump provided in step 105 comprises information regarding the original configuration of the first storage system. In particular, the storage dump comprises information regarding the number of disks in each RAID system of the storage system, the number of volumes in each RAID system as well as a path of a data flow within the storage system. Furthermore, performance data for various components of the storage system is obtained, for example, by a monitoring system of the first storage system. Practically all storage systems come with a special tool used for the purpose of performance monitoring. Generally, this is a built-in feature of the system or comes as a part of the default package with the purchase of the storage system. This tool monitors and records performance parameters for all the major components of the storage system whose performance needs to be evaluated. In case of the ETERNUS storage system of the Fujitsu Technology Solutions GmbH, Germany, the tool used to obtain that performance data is referred to as Performance Monitoring Control Command (PMCC). The obtained performance data may comprise data regarding RAID groups, volumes, front ports and other components of the storage system. Optionally, the user may provide further information required or beneficial for a system configuration. Examples of such additional information are network addresses such as an IP address of a storage system used for simulation of the first storage system and/or IP addresses of servers accessing the second storage system.

In a subsequent step 110, the storage architecture of the second storage system needed to simulate the workload of the first storage system is determined. For this purpose, the system analyzes the configuration of the storage system as contained in the dump file inputted in step 105. Furthermore, the performance data may be analyzed to identify components that are not or barely used in the storage system.

Information about all working RAID groups are extracted. For the purpose of the simulation, RAID groups with zero input/output operations per second (IOPS) are not considered. Alternatively, a flexible threshold value may be used to distinguish between active RAID groups, which are considered and simulated in the second storage system, and inactive RAID groups which are not considered and simulated in the subsequent simulation and whose workload, if any, is not simulated. Furthermore, information about active volumes is analyzed. Similar as the analysis with respect to the RAID groups, if a volume has zero IOPS or a number of IOPS below a given threshold, then the volume is not considered for a subsequent simulation.

As a result of step 110, the total number of disks needed as well as the number of controller modules and ports required to simulate a storage system essentially equivalent to the first storage system can be determined.

If the test environment comprises a sufficient number of components to simulate all hardware components of the first storage system, in a decision step 115, the method can immediately proceed to step 150, in which the second storage system is configured in an equivalent way to the first storage system. This essentially means that the storage system used in the test environment provides essentially the same storage architecture and no further simplification of the equivalent storage system determined in step 110 is required.

However, in most situations, not all hardware components of a first storage system may be available in a testing environment. In other words, a similar storage architecture is not available for simulation and the decision in step 115 is answered in the negative.

This case is addressed by two main factors. First, the number of disks used in the second storage system can be reduced. Furthermore, the number of controller modules and ports can also be reduced. This is implemented by executing a subsequent optimization procedure comprising steps 120 to 145 before the system configuration is carried out in step 150.

In particular, in step 120, a reduced number of storage devices such as disks of the second storage system may be configured compared to the storage devices of the first storage system. The number of disks can be reduced in either one of two ways. By default, a minimum RAID configuration as determined by strict hardware constraints is used. For this purpose, in step 125, for each detected RAID group, a minimum number of disks required to implement a specific RAID level may be used. For example, for a RAID-1 system, the provision of two disks is sufficient. Similarly, for a RAID-5 system, only three disks are required, and for a RAID-6 system, a minimum of four disks are required to implement the RAID group.

Alternatively, in a step 130, the user may manually specify a RAID configuration for one or more RAID groups. For example, a user may decide to use a number of disks equivalent to the number of disks of the system to be analyzed with respect to a part of a first storage system in detail. Other RAID groups can be created with a minimum configuration as detailed above.

Other storage system components are by default also simulated using a minimum configuration. Thus, in a subsequent step 135, a configuration of other components of the second storage system may be determined. The number of controller modules, ports and port groups may be reduced with respect to the original configuration of the first storage system. For example, if an original port group of the system to be analyzed comprises ports 1, 2, and 5, but the hardware used to simulate the load of the storage system only comprises ports 1, 2 and 3, the corresponding port group of the second storage system will only comprise ports 1 and 2. Similar simplifications may be applied for other logical groupings, such as affinity groups, logical unit number (LUN) groups, and the like.

As detailed before with respect to the disks of the RAID groups, this configuration may be performed in a step 140 automatically, based on a default minimum configuration, and/or may be modified in a step 145 using a graphical user interface of the simulation software in accordance with specific needs of a user.

Once the components of the storage system used for simulation in accordance with the storage architecture analyzed in step 110 and potentially simplified in steps 120 to 145 are configured in step 150, a number of servers are configured in step 155 that are used to operate the second storage system. The servers configured in step 155 will be used to generate a workload for the second storage system essentially equivalent to the workload as experienced by the first storage system.

As a result of the automatic configuration of the second storage system, the simulation software automatically generates virtual machines for all active RAID groups of the first storage system. The second storage system thus comprises corresponding RAID groups with the same RAID level as the first storage system. Within the RAID groups, only active volumes are simulated. In effect, the names of RAID groups and volumes are kept the same as in the customer environment, which helps with performing an evaluation of a simulated workload.

For this purpose, in a subsequent step 160, fingerprint data is generated. This fingerprint data can be generated automatically, for example, based on performance data of the first storage system provided in step 105, or provided manually for testing purposes. For example, fingerprint data putting a specific load on a given part of the second storage system may be provided by a system engineer.

The fingerprint data generated in step 160 is divided into two distinct parts. The first fingerprint comprises an identifier of a storage volume associated with that fingerprint as well as information about rate, size and/or type of accesses to that storage volume. In other words, the first fingerprint characterizes the nature of the storage accesses to a given storage volume. A second part of the fingerprint data comprises an identifier of the respective storage volume as well as information about an average access rate to the storage volume for a predetermined time segment. In other words, the second part of the fingerprint refers to and limits the development of and limits the load of a particular storage volume over time. Together, the first and second part of the fingerprint represent a workload of the first storage system for a given storage volume. If a fingerprint is provided for each active storage volume, an equivalent overall workload of the first storage system can thus be regenerated based on the fingerprint data.

Based on the information contained in the fingerprint data, the system configured in steps 150 and 155 can be used to simulate the workload of the first storage system in the second storage system.

The following figures show selected aspects of the architecture and components of the first storage system and the corresponding second storage system.

Figure 2:
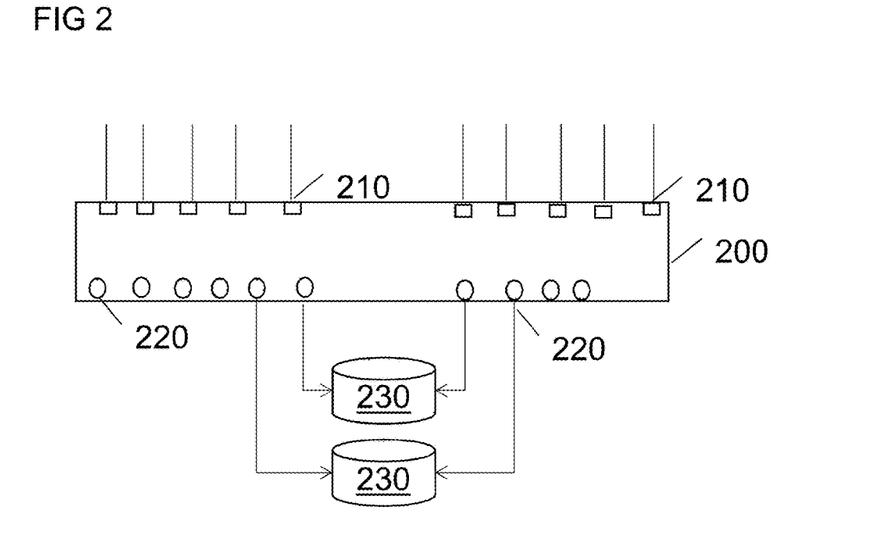
FIG. 2 shows a load balancing at front end ports of a first storage system.

FIG. 2 shows a load balancing at front end ports of a storage system 200. The storage system 200 may be located at a customer site. Its load is to be simulated using another storage system in a test environment. The storage system 200 comprises a plurality of front end ports 210 for connection to a storage area network (SAN). Over the SAN read and write requests are received by the storage system. The storage system 200 further comprises back end ports 220. Through the back end ports 220, the storage system 200 connects to a plurality of disks 230. In the example of FIG. 2, each disk 230 is connected by two different back end ports 220 for redundancy and performance reasons. In general, disks 230 or other storage devices may be connected by any number of back end ports 230 to a storage system. Thus, requests received at the front ports 210 of the storage system 200 can be balanced across the back end ports 220 and disks 230.

For the purpose of the simulation, the paths through which data flows in the storage system 200 of the customer environment are traced. This trace information provides information regarding the volumes collected to LUNs, port groups, host groups, and host affinity. This information can be tracked using a so-called "storage dump" of the storage system 200 of the customer. Based on the information provided in the storage dump, modeling and implementation of whole paths comprising, for example, a LUN group, a port or a port group and a host group, in the storage system 200 can be performed automatically.

Figure 3:
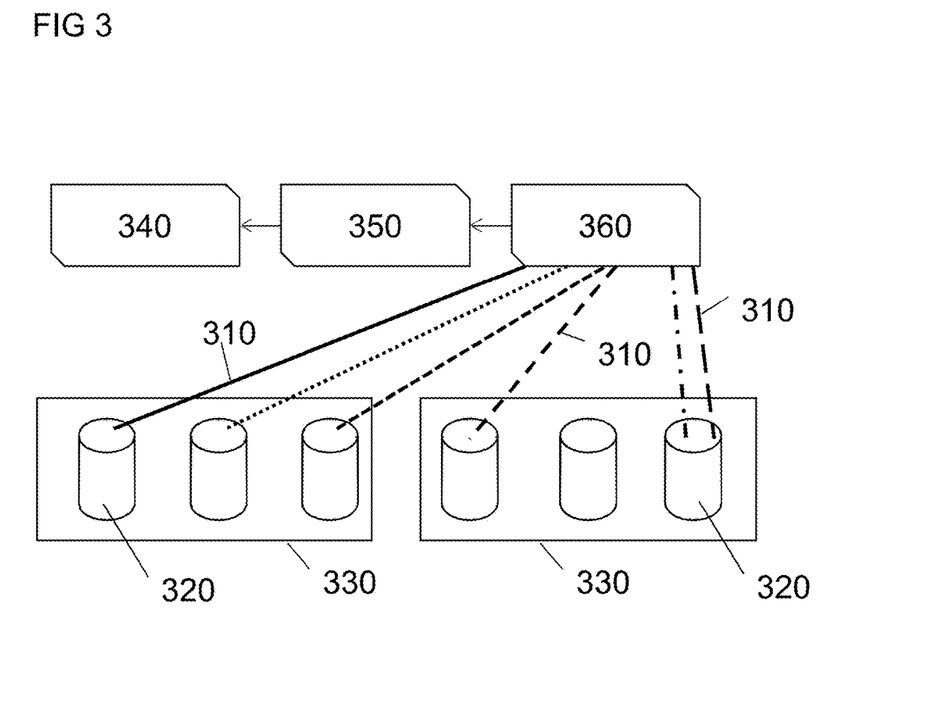
FIG. 3 shows path information obtained from a storage dump of the first storage system.

FIG. 3 shows path information obtained from a storage dump. In particular, it shows different paths 310 connecting six different RAID volumes 320 of two different RAID groups 330. As the information contained in the storage dump does not provide information about the number of servers used in the customer environment to access the storage system 200 under analysis, in the second storage system all paths end at a common host group 340. The common host group 340 is configured to access all port groups 350 of the second storage system and can therefore access any LUN group 360. It should be noted that these simplifications do not affect the front load balancing shown in FIG. 2.

Figure 4:
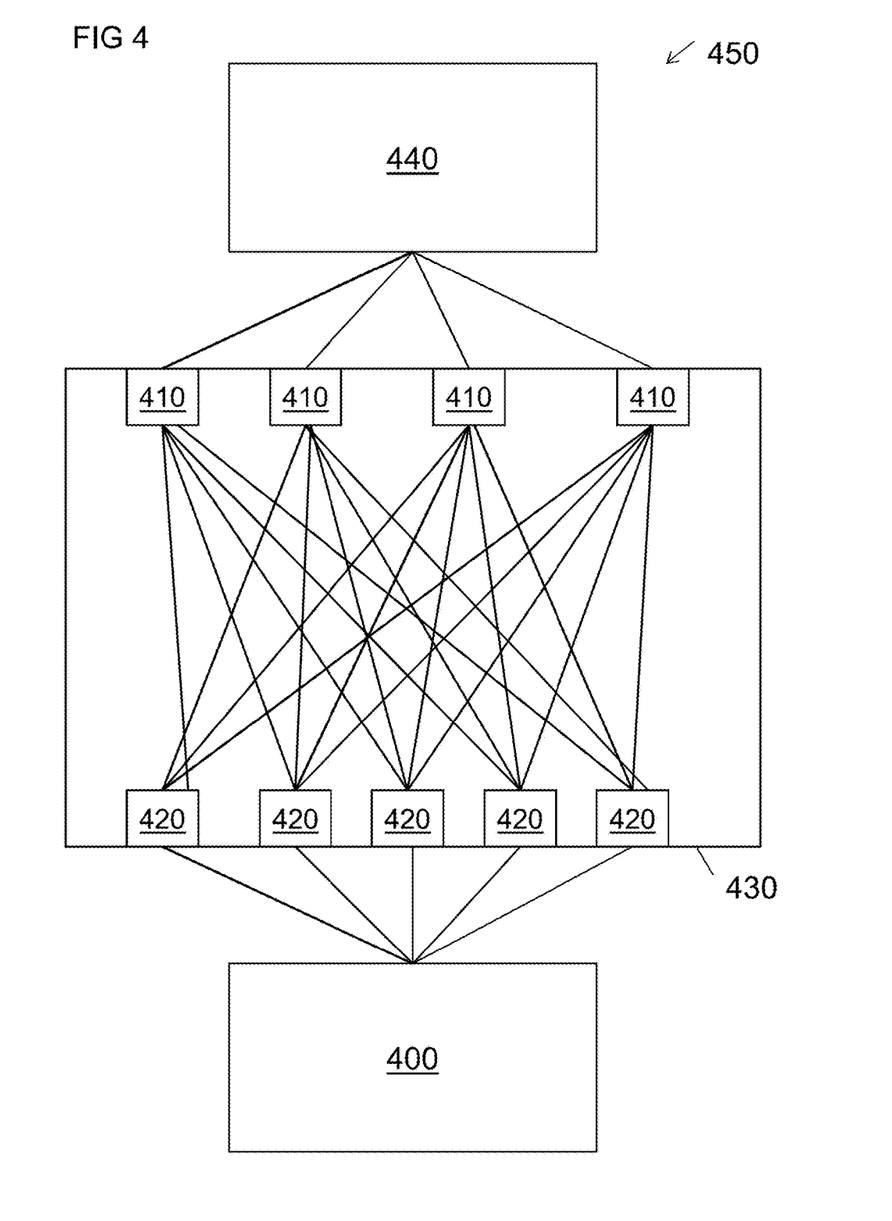
FIG. 4 shows a test environment comprising a second storage system.

As a result, a special form of zoning is implemented. In particular, a so-called "one-to-all zoning" is applied in a test environment 450 as detailed in FIG. 4. The test environment 450 comprises a second storage system 400, a network switch 430 and a server computer 440. The network switch 430 is a Fibre Channel switch that implements an SAN. As can be seen in FIG. 4, each host port 410 of the network switch 430 connects to each storage port 420 of the second storage system 400.

For the provision of the simulated work load for the second storage system 400, a virtualization system is used. In particular, the single physical server computer 440 makes use of a hypervisor such as the virtualization software EXSI 5.0 or above of VMware Inc., Palo Alto, US, to run a number of virtual machines within the server computer 440 of the test environment 450 used to simulate the storage system 200.

For simplification of the configuration, only a single virtual machine is installed in the virtualization system. The virtual machine description is provided by the simulation software used for the automatic configuration and/or operation of the testing environment. Alternatively, configuration of the virtual machine to be provided can be altered by the user. Based on the single template virtual machine provided, other virtual machines are cloned automatically.

Figure 5:
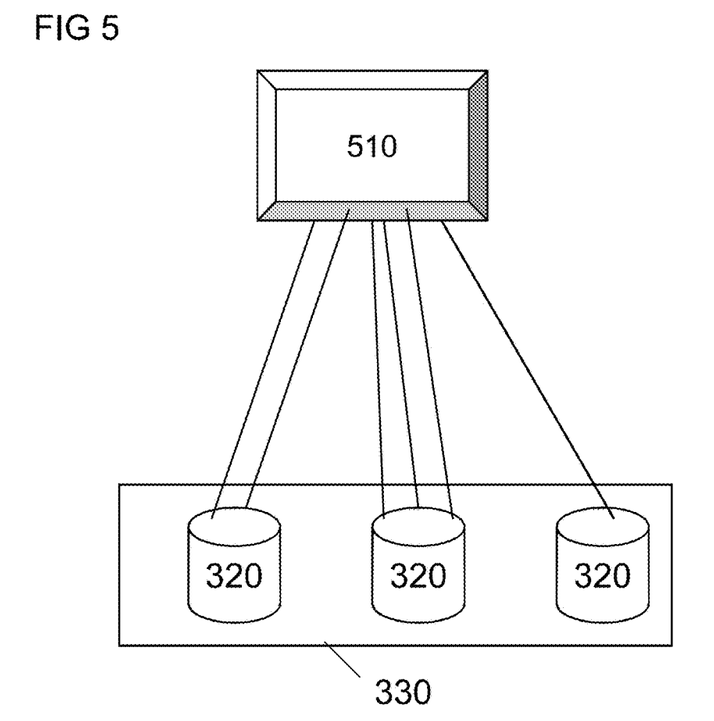
FIG. 5 show an example of a virtual machine used to implement a RAID group for the second storage system.

FIG. 5 shows a virtual machine 510 that implements a RAID group 330 comprising three RAID volumes 320. One virtual machine 510 is required for each active RAID group 330 of the analyzed storage system 200 of the customer configuration. In other words, one virtual machine 510 is used to implement each RAID group 330 of the first storage system 200. Preferably, the generated virtual machine 510 is named in an automatic fashion based on the information obtained from the configuration of the first storage system 200. For example, a common prefix followed by a name corresponding to the name of the RAID group 330 in the customer configuration can be used. For example, a virtual machine 510 used to implement a RAID group 330 named "RAIDA" of the storage system 200 may be named "VM_RAIDA" in the test environment 450.

Once the virtual machine 510 for the RAID group 330 is generated, all volumes 320 contained in the RAID group 330 are mapped to the virtual machine 510. The path via which each volume 320 is connected is mapped in accordance with information obtained from the storage dump to maintain host affinity. In VMWare ESX, the path may follow a round robin approach for load balancing, as detailed in the Technical Note by VMware on "Round-Robin Load Balancing", 2007, Revision 20071119. However, this may be changed by the user. By default, the above mentioned provisioning and configuration of the virtual machine 510 is provided automatically in the background by the software to configure the test environment 450.

Figure 6:
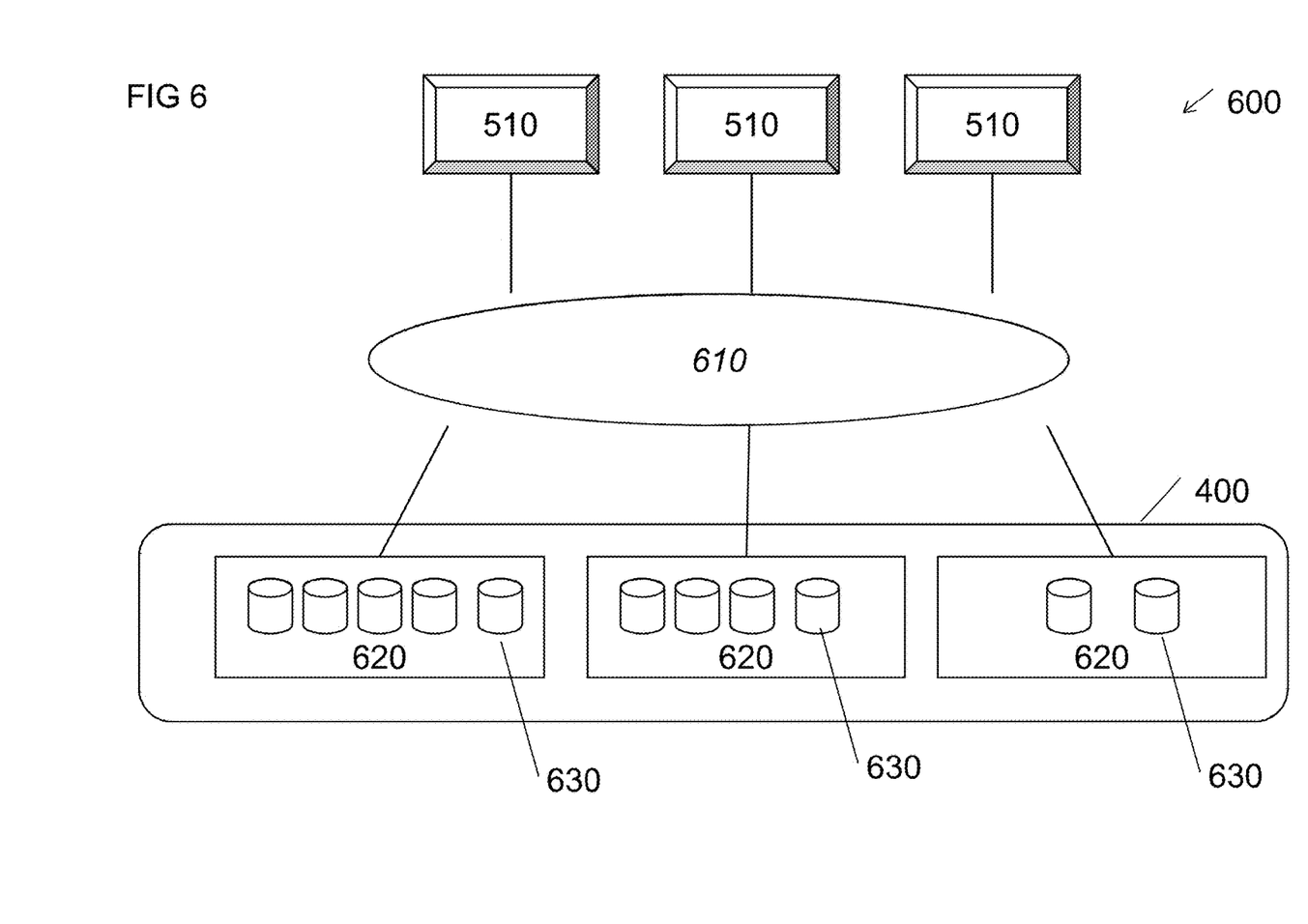
FIG. 6 shows an architecture of the second storage system.

FIG. 6 shows an example of the overall architecture 600 of the test environment 450. It comprises a plurality of virtual machines 510 implementing the RAID groups 330 of the first storage system 200. These are executed by the server computer 440 running a hypervisor 610. Through the hypervisor 610, the virtual machines 510 access components of physical RAID systems 620 comprising disks 630 of the storage system 400 of the test environment 450.

When particularly high workloads are to be simulated, the test environment 450 may comprise more than one server computer 440 (not shown). In this case, every server computer will comprise a virtual machine 510 for each active RAID group 330 of the first storage system 200 while the I/O load will be spread across the different server computers running the respective virtual machines 510.

Figure 7A:
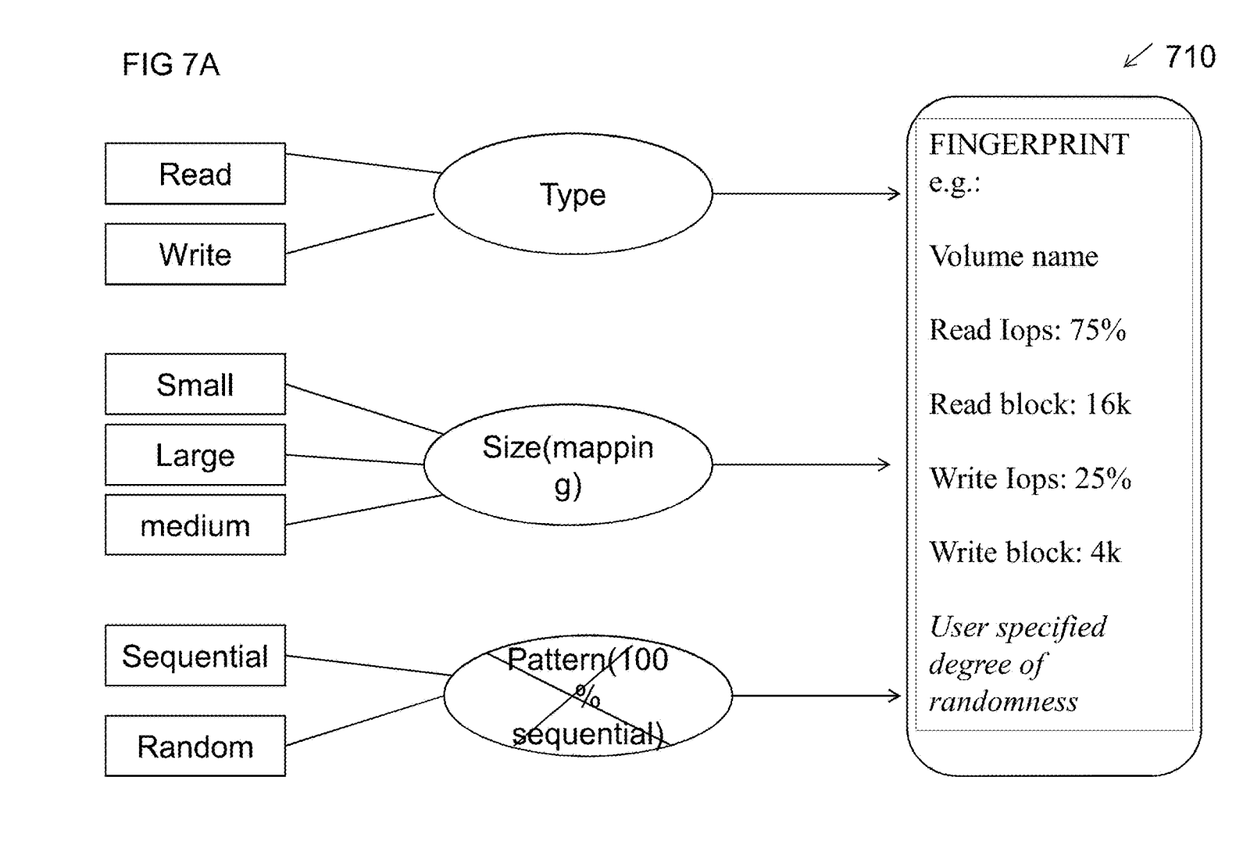
FIGS. 7A and 7B show a data structure for fingerprints used to simulate a workload.
Figure 7B:
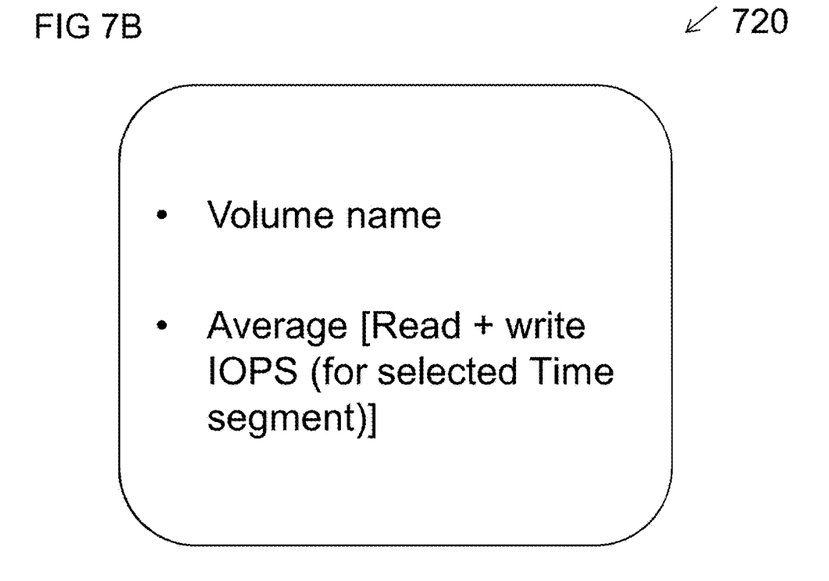

FIGS. 7A and 7B show the data structure of fingerprints used to simulate a workload of the first storage system 200 in the test environment 450.

To generate the respective data structures, the user is asked to specify time segments or use default time segments used for the simulation. For example, a time segment having a length between 30 seconds and up to five minutes may be specified by a user. Based on the specified time segment, the total workload observed for the storage system 200, for example, based on log files is divided into separate chunks. For example, for time segments of five minutes, performance data collected over the course of an hour can be divided into twelve separate chunks. For each chunk and RAID volume 320, a set of fingerprints is generated and later executed by the virtual machines 510.

Two different types of fingerprints may be generated. A first fingerprint 710 comprises information regarding accesses to a given RAID volume 320. This is shown in FIG. 7A. In particular, the type of storage access, i.e. whether it is a read or write access, is recorded for each access. Furthermore, the size of accesses may be analyzed. The read IOPS for each segment is calculated by taking an average of all the read IOPS for the time span equal to that of the segment specified by user. The same process is carried out for the write IOPS, read block size and write block size as well. Furthermore, the fingerprint 710 may contain information regarding the randomness of the received accesses, i.e. whether they are sequential or random in nature. However, this information is not obtained automatically but may be specified by the user. As a result, a first fingerprint 710 is generated for each RAID volume 320 specifying the volume name, the percentage of read IOPS, the average size of a read block, the percentage of write IOPS, and the average size of a write block as well as a user specified degree of randomness.

FIG. 7B shows the data structure of a second fingerprint 720. The second fingerprint 720 comprises the volume name of the RAID volume 320 as well as the average access rate for a selected time segment. In other words, the second fingerprint 720 shows the total number of read and write IOPS for a given time segment to show the absolute load of the corresponding RAID volume 320 in a given time segment.

During the running of a simulated workload, each virtual machine 510 used to operate a particular RAID group 330 processes at least one first fingerprint 710 in real time for each time segment. For this purpose, a benchmarking software such as the software described in the paper 479-2013 of the SAS Global Forum 2013 titled "Benchmarking SAS® I/O: Verifying I/O Performance Using fio" by Spencer Hayes, is used to generate a workload in accordance with the first fingerprint 710.

As benchmarking software by definition tries to obtain the maximum number of reads and writes according to the profile stored in the first fingerprint 710, the second fingerprint 720 is used by the hypervisor 610 to limit a maximum data flow in accordance with the information stored therein. By the hypervisor 610, the number of IOPS for each RAID volume 320 for each virtual machine 510 can be set. Based on the second fingerprint 720, the average IOPS on each RAID volume 320 is calculated and then set as a maximum limit on a corresponding link for each virtual machine 510. This information is processed in real time for each time segment and each virtual machine 510. Thus, together with the output from the benchmarking software, a workload characteristic for the first storage system 200 can be simulated for the second storage system 400.

The maximum limit may be set for each raw device mapping (RDM), corresponding to a symbolic link from a virtual machine file system (VMFS) volume to a raw LUN device. This makes the LUN appear as a physical drive on the virtual machine. In reality, a mapping le is available with the virtual machine, and not the LUN. When a LUN is opened for access, first, the mapping le is accessed to obtain the reference information regarding the connected LUN. After that, read and write IO's directly go to a connected LUN instead of going to the mapping file.

According to an optional feature of the simulation software, a separate software module is provided which provides graphical information for the original workload of the first storage system 200 and the simulated workload in the second storage system 400. This helps in analyzing the similarity between the respective scenarios and storage systems, respectively. Preferably, graphs are generated for all relevant storage components, i.e. RAID groups 330, RAID volumes 320, and port groups based on the names determined from the storage dump. For example, for the RAID groups 330 and volumes 320, IOPS, read and write block sizes, response times and other storage parameters may be plotted. For the port groups, the front load balancing of the storage systems 200 and 400 may be plotted.

Figure 8A:
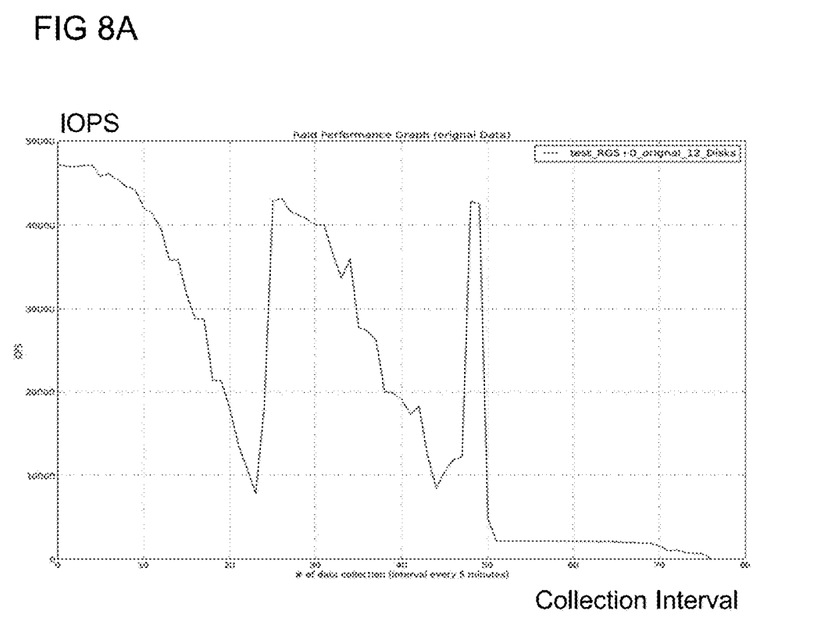
FIGS. 8A and 8B show performance data of a first storage system and a second storage system.
Figure 8B:
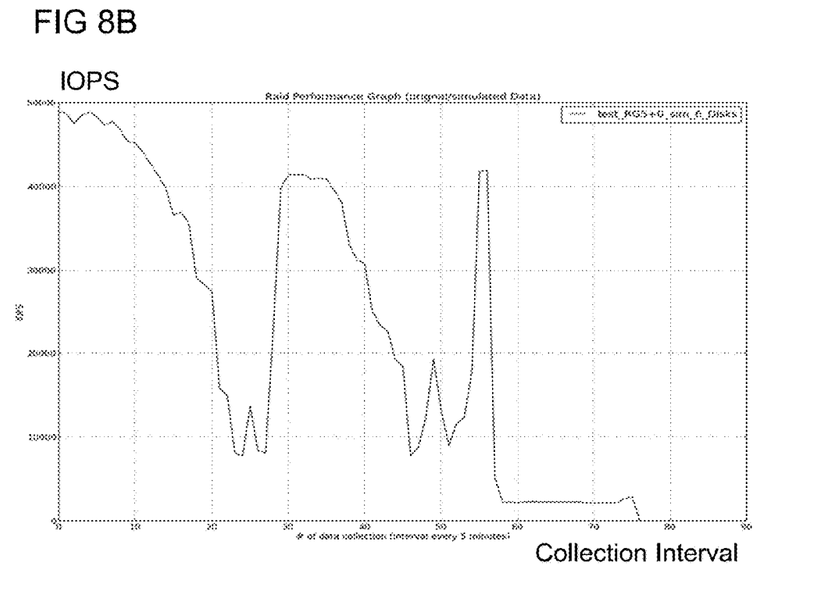

FIGS. 8A and 8B show results of the RAID performance plot for a so-called "RAID-5+0" system. FIG. 8A shows the workload of the original first storage system 200 comprising twelve disks 230 in a RAID-5+0 configuration. FIG. 8A shows the number of IOPS averaged over several subsequent data collection intervals of five minutes each.

FIG. 8B shows the corresponding simulated workload of a second storage system 400 for the same data collection intervals. As can be seen from FIG. 8B, the general shape and amplitude of the simulated workload patterns correspond quite well with the original workload pattern of FIG. 8A. However, due to some simplifications applied, for example, by reducing the number of disks in the second storage system 400 to a total of six disks 630, some minor variations between the simulated workload and the original workload can be observed.

This and other information provided by the simulated workload of the second storage system 400 can be used to pinpoint bottlenecks in the configuration of the first storage system 200. Furthermore, by modifying the configuration of the second storage system 400, the impact of such configuration changes can be first analyzed, before they are applied to the customer storage system 200.

Our simulation software makes it possible to simulate the working pattern of a storage system 200 with the simulation of hardware. The simulation software is capable of reproducing an exact number of read/write input/output operations per second (IOPS) and read/write packet sizes, in a test environment 450 by utilizing a much smaller number of server computers and storage devices compared to the original storage system 200 and environment to be analyzed. The simulation software provides the following functionalities and features:

an understanding of the workload and hardware configuration of a first storage system 200, defining a minimum hardware configuration of a second storage system 400 required to recreate a specific workload, giving specific recommendations to a user of the simulation software when the hardware requirements are not currently met, front load balancing, i.e. the data in the second storage system 400 follows the same storage path as in the first storage system 200, automation of hardware configuration including the formation of RAID groups 330, the cloning of virtual machines 510, the mapping of paths 310 in accordance with a scenario outlined by a customer between virtual machines 510 and the storage system 400 and the running of the simulation for a specified amount of time, and generation of result graphs which help the user to analyze the similarities between the second storage system 400 and the first storage system 200.

Such a software results in a number of advantages, comprising minimization of hardware requirements, creation of simulations, potentially with the help of a user-friendly graphical user interface (GUI), which in turn reduces the time and effort needed in system analysis. It also adds flexibility, when basic requirements to simulate a storage system 200 are not met.

We claim:

1. A computer system that simulates a workload of a storage system comprising a non-transitory storage medium comprising instruction code for the computer system, wherein the instruction code, when executed on the computer system, performs steps as follows:

obtaining, from a first storage system, configuration data regarding first components of the first storage system including at least one first redundant array of independent disks (RAID) group, wherein the first storage system is deployed in a customer environment;

obtaining, from the first storage system, performance data comprising workload information of the first storage system;

configuring second components of a second storage system including at least one corresponding second RAID group corresponding to the at least one first RAID group, based on the obtained configuration data, wherein the second storage system is deployed in a test environment, a number of the second components of the second storage system is smaller than a number of the first components of the first storage system, and only first RAID groups having a workload in excess of a predefined threshold are mapped to correspond second RAID groups; and operating the second storage system using a simulated workload based on the obtained performance data, resulting in a front loading of the second storage system equivalent to a front loading of the first storage system.

2. The computer system according to claim 1, wherein obtaining configuration data comprises obtaining and analyzing a dump file of the first storage system, wherein data of the dump file is representative of the configuration of the first storage system.

3. The computer system according to claim 1, wherein the instruction code, when executed on the computer system, performs:

analyzing the obtained performance data and generating fingerprint data comprising the workload information for the simulated workload.

4. The computer system according to claim 3, wherein the fingerprint data comprises, for each storage volume of the first storage system, a first fingerprint and/or at least one second fingerprint wherein the first fingerprint comprises an identifier of the storage volume and information about the rate, size and/or type of accesses to the storage volume including at least a number of read input/output operations per second (IOPS), a read block size, a number of write TOPS or a write block size of the analyzed performance data, and each second fingerprint comprises an identifier of the storage volume and information about an average access rate to the storage volume for a predetermined time segment analyzed comprising an average sum of read and write IOPS for the predetermined time segment of analyzed performance data, respectively.

5. The computer system according to claim 1, wherein, in obtaining configuration data regarding first components, configuration data of at least one physical hardware component of the first storage system is obtained, and, in configuring second components, a corresponding virtual hardware component of the test environment is configured.

6. A method simulating a workload of a storage system comprising:
   obtaining, from a first storage system, configuration data regarding first components of the first storage system including at least one first redundant array of independent disks (RAID) group, wherein the first storage system is deployed in a customer environment;
   obtaining, from the first storage system, performance data comprising workload information of the first storage system;
   configuring second components of a second storage system including at least one corresponding second RAID group corresponding to the at least one first RAID group, based on the obtained configuration data, wherein
   the second storage system is deployed in a test environment,
   a number of the second components of the second storage system is smaller than a number of the first components of the first storage system, and
   only first RAID groups having a workload in excess of a predefined threshold are mapped to corresponding second RAID groups; and
   operating the second storage system using a simulated workload based on the obtained performance data.

7. The method according to claim 6, wherein the first components comprise a first plurality of ports, the configuration data comprises information about at least one port group and, for each port group, information about a first group of ports of the first plurality of ports associated with the respective port group, and the second components of the second storage system comprise a second plurality of ports, wherein the second storage system is configured to create only those port groups comprising at least one port of the second plurality of ports and to associate only ports of the second plurality of ports with a corresponding port group of the second storage system.

8. The method according to claim 6, wherein the first components further comprise a first set of storage devices associated with the at least one first RAID group, the configuration data comprises data indicating a RAID level used by the at least one first RAID group, and the second components further comprise a second set of storage devices associated with the at least one second RAID group, wherein the second set of storage devices consists of a minimum number of storage devices required to simulate a RAID group using the RAID level indicated by the configuration data.

9. The method according to claim 6, wherein obtaining configuration data comprises obtaining and analyzing a dump file of the first storage system, wherein data of the dump file is representative of the configuration of the first storage system.

10. The method according to claim 6, further comprising analyzing the obtained performance data to generate fingerprint data comprising the workload information for the simulated workload.

11. The method according to claim 10, wherein the fingerprint data comprises, for each storage volume of the first storage system, a first fingerprint and/or at least one second fingerprint wherein the first fingerprint comprises an identifier of the storage volume and information about the rate, size and/or type of accesses to the storage volume including at least a number of read input/output operation per second (IOPS), a read block size, a number of write IOPS or a write block size of the analyzed performance data, and each second fingerprint comprises an identifier of the storage volume and information about an average access rate to the storage volume for a predetermined time segment analyzed comprising an average sum of read and write IOPS for the predetermined time segment of analyzed performance data, respectively.

12. The method according to claim 6, wherein, in obtaining configuration data regarding first components, configuration data of at least one physical hardware component of the first storage system is obtained, and, in configuring second components, a corresponding virtual hardware components of the test environment is configured.

13. The method according to claim 12, wherein the first storage system comprises a plurality of first RAID groups and the test environment comprises a corresponding number of second RAID groups, wherein for each first RAID group is a virtual machine controlled by a common hypervisor of the test environment and is created by cloning a virtual machine from a template virtual machine.

14. The method according to claim 6, wherein data of the simulated workload in the second storage system follows a path corresponding to a path of data in the first storage system such that the front loading of the second storage system corresponds to the front loading of the first storage system.

15. The method according to claim 6, further comprising generating a visual representation of the simulated workload of the second storage system and/or a measured workload of the first storage system.

* * * * *